United States Patent
Park et al.

(10) Patent No.: US 7,033,503 B2
(45) Date of Patent: Apr. 25, 2006

(54) MUNICIPAL WASTEWATER TREATMENT APPARATUS AND PROCESS WITH A CONTINUOUS FEED AND CYCLIC AERATION

(75) Inventors: Wan Cheol Park, Seoul (KR); Tae Hyung Kim, Seongnam-si (KR); Seung Ho Lee, Miryang-si (KR); Chang Ju Lee, Seoul (KR); Mi Ae Lee, Seoul (KR)

(73) Assignee: Korean Institute of Science and Technology, Seoul (KR)

( * ) Notice: Subject to any disclaimer, the term of this patent is extended or adjusted under 35 U.S.C. 154(b) by 0 days.

(21) Appl. No.: 10/883,227

(22) Filed: Jul. 1, 2004

(65) Prior Publication Data

US 2005/0205490 A1 Sep. 22, 2005

(30) Foreign Application Priority Data

Mar. 18, 2004 (KR) .................. 10-2004-0018320

(51) Int. Cl.
*C02F 3/30* (2006.01)
(52) U.S. Cl. .................. 210/609; 210/622; 210/623; 210/630; 210/195.1; 210/259; 210/903; 210/906
(58) Field of Classification Search ............ 210/605, 210/609, 620–623, 630, 195.1, 196, 252, 210/259, 260, 903, 906
See application file for complete search history.

(56) References Cited

U.S. PATENT DOCUMENTS

| | | | | |
|---|---|---|---|---|
| 4,655,925 A * | 4/1987 | Tabata et al. | ............... | 210/605 |
| 5,266,200 A * | 11/1993 | Reid | ............... | 210/605 |
| 5,376,275 A * | 12/1994 | Raper | ............... | 210/605 |
| 6,444,125 B1 * | 9/2002 | Han | ............... | 210/605 |
| 6,616,844 B1 * | 9/2003 | Park et al. | ............... | 210/605 |
| 6,767,462 B1 * | 7/2004 | Park | ............... | 210/605 |
| 2003/0111412 A1 * | 6/2003 | Jeong et al. | ............... | 210/605 |

FOREIGN PATENT DOCUMENTS

KR 2001-094152 * 10/2001

* cited by examiner

*Primary Examiner*—Fred G. Prince
(74) *Attorney, Agent, or Firm*—Jones Day

(57) ABSTRACT

Disclosed are efficient municipal wastewater treatment apparatus and process characterized in that the nitrogen is removed by nitrification and denitrification reaction in the cyclic aeration reactor wherein Anaerobic state, Anoxic state and Oxic state are change into time concept in a single reactor, and the untreated organic materials are further removed by the 24-hour-continuous reactor.

3 Claims, 1 Drawing Sheet

US 7,033,503 B2

MUNICIPAL WASTEWATER TREATMENT APPARATUS AND PROCESS WITH A CONTINUOUS FEED AND CYCLIC AERATION

REFERENCE TO RELATED APPLICATIONS

This application claims foreign priority benefit under 35 U.S.C. § 119 of Korean Application No. 10-2004-0018320 filed on Mar. 18, 2004.

FIELD OF THE INVENTION

The present invention relates to municipal wastewater treatment apparatus and process using a continuous feed and cyclic aeration, wherein Anaerobic state, Anoxic state and Oxic state in a single reactor are change into time concept, to simultaneously remove organic materials and nutrients.

BACKGROUND OF THE INVENTION

In a complete batch type SBR, the cycle is started by Anoxic inflow of municipal wastewater after discharge of treated water, and the denitrification is carried out. The entered wastewater is exhausted as carbon source to enhance the growth conditions of nitrification microorganisms and the aerobic reaction occurs without influx of the wastewater. Also, the wastewater is not flowed in the sedimentation/discharge procedure. Such SBR, which is a complete batch type, has a high sedimentation efficiency and can increase the discharge percent of the treated water.

Omniflo SBR includes a logic control unit and an aeration unit, and can optimize the nitrification and denitrification procedures by controlling the aeration unit by means of DO determination.

Cyclic Activated Sludge System (CASS™) developed by Transenviro, Inc. comprises a selector in an intake, to which the returned sludge is entered. The main denitrification reactions occur at mix tank and by the Anoxic condition inside sludge floc under Aerobic condition. The system has the advantages that the flotation of sludge is avoided since the denitrification by wastewater influx in the sedimentation step is diminished, the growth of filamentous organisms is suppressed and the stirrer is not needed due to the hydraulic stirrability.

In Intermittent Cyclic Extended Aeration System (ICEAS), wherein the influx water is fed continuously in all phases, the main denitrification reactions occur by the Anoxic condition inside sludge floc induced by air on/off. The system consists of a single reactor that comprises a selector of the top region, a main tank of the intermediate region and a sedimentation tank of the bottom. The selector of the top region promotes the growth of the denitrification microorganisms and suppresses the growth of filamentous organisms at the same time of removing the nitrogen.

The SBR reactor, CASS and ICEAS, that have been installed to the conventional municipal wastewater treatment plant, have the disadvantages that the operations thereof are complicated and some organic materials may be discharged in the untreated state in the Anoxic and Anaerobic states. Therefore, there are demands for improvement of the treatment procedures in order to treat the organic materials more completely.

SUMMARY OF THE INVENTION

The object of the present invention is to provide the efficient municipal wastewater treatment apparatus and process, that can remove the nitrogen by inducing nitrification and denitrification reaction in a single reactor and remove the organic materials more efficiently in the municipal wastewater treatment process.

It has been found that the object could be accomplished by treating municipal wastewater using a continuous aeration reactor and a cyclic aeration reactor to remove organic materials and nutrients at once, the cyclic aeration stage being used to remove the nitrogen by nitrification and denitrification reaction and the organic materials being removed more efficiently by a continuous aeration stage in the municipal wastewater treatment process.

Therefore, the present invention provides the efficient municipal wastewater treatment apparatus and process characterized in that the nitrogen is removed by nitrification and denitrification reaction in the cyclic aeration reactor wherein Anaerobic state, Anoxic state and Oxic state are change into time concept in a single reactor, and the untreated organic materials are further removed by the 24 hour-continuous aeration reactor.

BRIEF DESCRIPTION OF DRAWING

The above and other objects and features of the present invention will become apparent from the following description of the preferred embodiments given in conjunction with the accompanying drawing.

DETAILED DESCRIPTION OF THE PRESENT INVENTION

Figure 1:
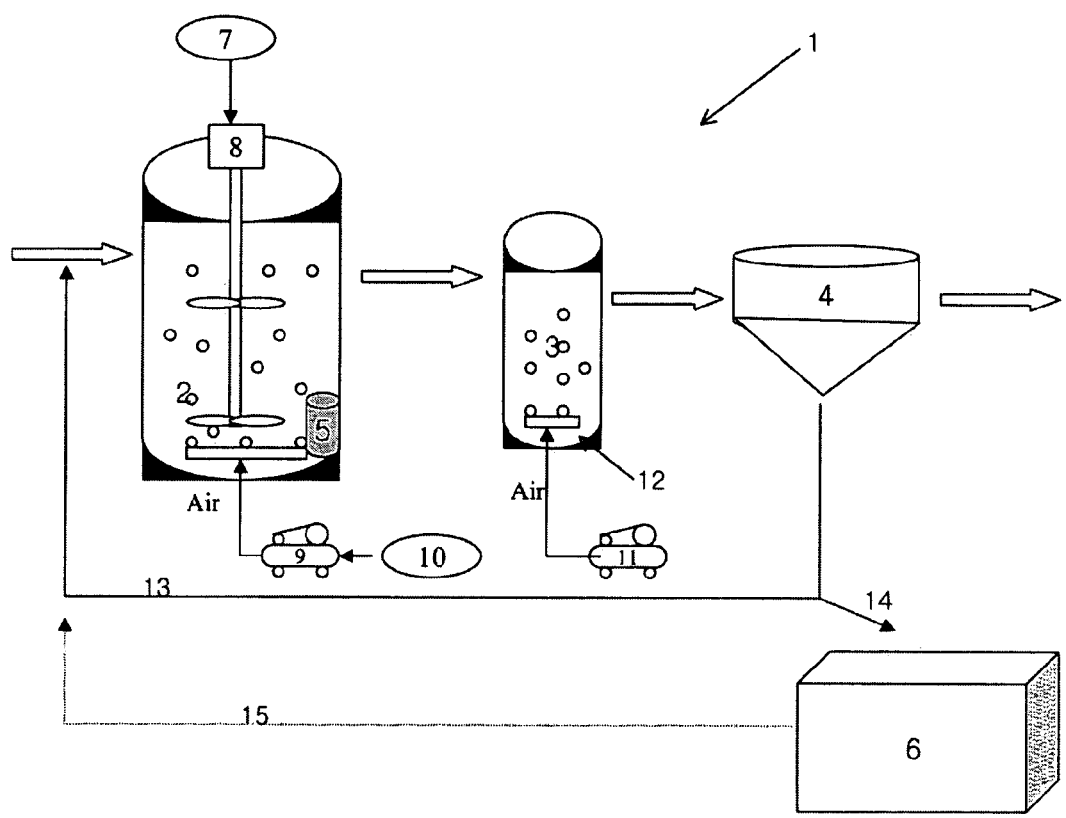
FIG. 1 illustrates a schematic diagram of municipal wastewater treatment apparatus using a continuous feed and cyclic aeration in accordance with the present invention.

The present invention is directed to municipal wastewater treatment apparatus and process using a continuous feed and cyclic aeration, wherein Anaerobic state, Anoxic state and Oxic state in a single reactor are change into time concept, to simultaneously remove organic materials and nutrients.

Specifically, the municipal wastewater treatment apparatus of the present invention, that adopts such a way that the municipal wastewater is fed continuously for 24 hours, comprises the following elements:

a cyclic aeration reactor 2 having the wastewater fed continuously for 24 hours, which is aerated cyclically by a timer that is operated at a predetermined time interval, wherein ammonia nitrogen is nitrified by the microorganisms eluted from a microorganism control tank in the Aerobic state, the nitrified nitrate nitrogen is reduced into $N_2$ gas and removed in the Anoxic state in which oxygen supply is stopped, and phosphorus is eluted in a form of orthophosphate (PO4-P) by phosphorus accumulating organisms (PAOs), which can accumulate phosphorus in a form of polyphosphate (poly-p) within the cell, in the Anaerobic state in which NOx-N concentration in the cyclic aeration reactor reaches zero by denitrification in the Anoxic state;

a microorganism control tank 5 which is equipped in the cyclic aeration reactor and elutes the activated microorganisms in the Aerobic state of the cyclic aeration reactor;

a continuous aeration reactor 3, which is aerated by oxygen fed continuously for 24 hours, to further treat some organic materials which is not treated in the cyclic aeration reactor due to the continuous influx;

a sedimentation tank 4 for solid-liquid separation of the microorganisms from the treated water;

a sludge return line 13 for returning the sedimented sludge in the sedimentation tank into the cyclic aeration reactor depending on the amount necessary for the microorganism concentration in the cyclic aeration reactor;

a waste sludge line 14 for transferring the excess of sludge in the sedimentation tank to a sludge storage tank 6;

a sludge storage tank 6 for discarding the excess of sludge; and a return line 13 of the sludge storage tank supernatant for supplying the supernatant to the cyclic aeration reactor together with the supplied wastewater.

Furthermore, the present invention provides a method for treating the municipal wastewater using a continuous feed and cyclic aeration comprising the following steps:

a nitrifying step of oxidizing ammonia nitrogen by the microorganisms eluted from the microorganism control tank in the Aerobic state of the cyclic aeration reactor;

a denitrifying step of reducing the nitrified nitrate nitrogen into $N_2$ gas in the Anoxic state of the cyclic aeration reactor in which oxygen supply is stopped;

a step of eluting phosphorus in a form of PO4-P by PAOs, which can accumulate phosphorus in a form of polyphosphate granule (Xpp) within the cell, in the Anaerobic state in which NOx-N concentration in the cyclic aeration reactor reaches zero by denitrification in the Anoxic state;

a continuous aeration step of treating secondarily some organic materials, which are not treated in the cyclic aeration step due to the continuous feeding, by using oxygen fed continuously for 24 hours;

a sedimentation step for solid-liquid separation of the microorganisms from the treated water;

a sludge return step for returning into the cyclic aeration reactor the sludge of necessary amount for the microorganism concentration in the cyclic aeration reactor among the sedimented sludge and concentrating the rest of the excessive sludge in a sludge storage tank; and a step of discarding the sludge concentrated in the sludge storage tank and supplying the sludge storage tank supernatant to the cyclic aeration reactor with the supplied wastewater.

Hereinafter, a more detailed description of the present invention is provided with reference to the drawing.

FIG. 1 illustrates an example of municipal wastewater treatment apparatus using a continuous feed and cyclic aeration in accordance with the present invention.

The municipal wastewater treatment apparatus 1 is for treating the municipal wastewater which is discharged from home.

The microorganism control tank 5 is equipped in the cyclic aeration reactor 2 such that the selectively cultured microorganisms can be stored for the prolonged period through the solid processing and slowly eluted after being activated by supplying the oxygen. Microorganisms activated in the microorganism control tank 5 are used to nitrify $NH_4$—N to $NO_3$—N through oxidization in the Aerobic state in which oxygen is fed in the cyclic aeration reactor.

In the Anoxic state of the cyclic aeration reactor in which oxygen supply is stopped, the nitrified $NO_3$—N is reduced by the denitrification using the organic materials in influxed wastewater to release the nitrogen as $N_2$ gas.

Once the detrification is accomplished in the Anoxic state, then the reactor becomes the Anaerobic state. In the Anaerobic state, phosphorus is eluted in a form of PO4-P by PAOs, and phosphorus is again removed through luxury up-take in the Aerobic state in which oxygen is re-supplied.

To overcome the disadvantage of the SBR reactor, that is operation complexity, the apparatus of the present invention comprises the 24 hour-continuous aeration reactor 3 whereby it is possible to more perfectly treat the organic materials that is primarily untreated in the Anoxic and Anaerobic states without oxygen feeding.

Then, the solid-liquid separation is carried out to separate the grown microorganisms from the treated water in the sedimentation tank 4, and the sedimented sludge is returned into the cyclic aeration reactor 2 via the sludge returning line 13 to obtain the steady amount of the microorganism in the cyclic aeration reactor 2.

To store the excess of sludge in a sludge storage tank 6, the sludge in the sedimentation tank is transferred to the sludge storage tank via the waste sludge line 14, and the supernatant is separated from the sludge concentrated in the sludge storage tank 6. The separated supernatant is again influxed in the treatment apparatus 1 via the sludge storage tank supernatant returning line 15 in order to treat the wastewater more perfectly.

The function of each tank in the continuous feed and cyclic aeration type of the wastewater treatment apparatus of the present invention will be described below in further detail based on one embodiment of the invention.

The continuous feed and cyclic aeration type of the municipal wastewater treatment apparatus 1 of the present invention adopts the cyclic aeration reactor 2 to remove the organic materials and nutrients at the same time, the reactor being operated such that Anaerobic state, Anoxic state and Oxic state are formed successively in a single reactor by changing space concept to time concept.

It is most important in the biological treatment of the cyclic aeration reactor 2 to maintain the stable quality of the treated water through separation of the treated material from the microorganisms together with the rapid removal of the organic materials by the microorganisms.

Thus, according to the present invention, the microorganism control tank 5 is filled with the solidified microorganisms having the good capability of removing the organic materials and the high sedimentation efficiency. The microorganisms of the microorganism control tank 5 are comprised primarily of the soil microorganisms and *Bacillus*-type microorganisms. The solidified microorganisms are activated by the influxed oxygen and then fed continuously to the cyclic aeration reactor 2.

The cyclic aeration reactor 2 can be aerated cyclically by a timer, that is operated at a predetermined time interval, in order to produce the aerobic, Anoxic and Anaerobic state periodically. In one embodiment, the total retention time of the wastewater in the cyclic aeration reactor is for example 6 hours where the time for supplying air is 3.5 hours, the retention time for the Anoxic state is 1.5 hours and the retention time for Anaerobic state is 1 hour. Each of retention time of the states in the reactor can be suitably selected depending on the condition of the wastewater and scale of the treatment plant.

Oxygen is fed into the cyclic aeration reactor 2 by the blower 9 which is automatically controlled by a blower timer for the Aerobic state. In the Aerobic state, the continuously fed oxygen is used to conduct the nitrification through the metabolism by the microorganisms activated in the microorganism control tank 5. The nitrification in the Aerobic state is carried out by the reactions as shown below.

$$NH_4^+ + 3/2O_2 \rightarrow NO_2^- + H_2O + 2H^+$$

$$NO_2^- + 1/2O_2 \rightarrow NO_3^-$$

In the above reactions, the microorganisms, which are involved in the oxidization reaction of $NH_4^+$ to $NO_2^-$, are bacteria of genus *Nitrosomonas*, such as *N. europaea* and *N. monocella*, and bacteria of genus *Nitrosococcus*.

The second oxidization reaction from $NO_2^-$ to $NO_3^-$ is conducted by the microorganisms of genus *Nitrobacter*, such as *N. agilis* and *N. winogradskyi*, and the microorganisms of genus *Nitrosocystis*.

In the Anoxic state where the oxygen supply is blocked by the blower timer, the denitrifying bacteria reduce the nitrified nitrate nitrogen (NOx-N), nitrified in the Aerobic state, into nitrogens by using the organic materials in the treated water as a carbon source according to the reaction below and the nitrogens fly out to the atmosphere as nitrogen gases.

$$NO_3 \rightarrow NO_2 \rightarrow NO \rightarrow N_2O \rightarrow N_2$$

The mixer 8 is fitted with the the cyclic aeration reactor in order to mix the materials in the reactor sufficiently and contact the denitrifying bacteria with the carbon source and the NOx-N in the Anoxic state. Although the acetic acid, citric acid, methanol and the like are external carbon sources useful as electron donor used in the denitrification reaction, the reactor is designed to utilize the organic materials in the treated materials as the internal carbon source for considering the economic reasons.

In the Anaerobic state wherein the concentration of NOx-N present in the cyclic aeration reactor reaches zero by denitrification in the Anoxic state, phosphorus is eluted in the form of PO4-P by PAOs, which can accumulate phosphorus in a form of polyphosphate (poly-p) granule (Xpp) within the cell. Phosphorus is removed again through luxury up-take whereby the microorganisms take more phosphorus, in the Aerobic state in which oxygen is re-supplied.

The treated water passed through the cyclic aeration reactor 2 is fed to the continuous aeration reactor 3 maintained in the Aerobic state by the air blown continuously for 24 hours. Some organic materials may be discharged in the untreated state in the Anoxic and Anaerobic states of the cyclic aeration reactor 2. To more completely treat such untreated organic materials in the discharged water, the water is transferred to the continuous aeration reactor 3 to which oxygen is continuously fed by the blower 11 to maintain the Aerobic state for 24 hours and the organic materials can be secondarily treated therein.

The treated water and the sludge passed through the continuous aeration reactor 3 are transported to the sedimentation tank 4. The discharged water from the continuous aeration reactor 3 comprises the microorganisms and the treated water. The microorganisms form flocs and the flocs are precipitated in the bottom of the sedimentation tank 4 by the gravity and the treated water is discharged in the top of the tank. Some of the precipitated sludge is returned into the cyclic aeration reactor 2 via the sludge returning line 13 to obtain the appropriate amount of the microorganism in the cyclic aeration reactor and the excess of sludge in the sedimentation tank is transferred to the sludge storage tank 6 via the waste sludge line 14.

The sludge concentrated in the storage tank 6 can be treated through the sludge treatment system which is selected depending on the scale of the wastewater treatment plant. In case of the large scale of the plant, a dehydrator is equipped with the plant for treating the sludge within the plant itself, which makes the cost for the sludge treatment economic. Meanwhile, it is economically effective to transport the concentrated sludge to the sludge treatment plant regularly and to treat the sludge therein. The supernatant in the sludge storage tank 6 is again influxed in the treatment apparatus 1 via the supernatant returning line 15 in order to establish the more perfect treatment of the wastewater.

The preferred embodiment of the present invention will now be described. This embodiment is intended to illustrate an example of the present invention, and to not limit the present invention thereto.

EXAMPLE

Abbreviations used in the Example indicate the following means:

BOD indicates a biological oxygen demand.

T-N (Total Nitrogen) refers to the sum of nitrogen, including organic nitrogen and the inorganic nitrogen $NO_2$—N and $NO_3$—N in wastewater.

T-P (Total Phosphorus) refers to the sum of soluble and insoluble phosphorus in wastewater.

A laboratory scale of a municipal wastewater treatment apparatus as shown in FIG. 1 was constructed using a transparent acryl substance. An experiment was carried out to treat source wastewater taken from a municipal wastewater treatment plant, located Gyeong-gi Province, Republic of Korea. The types of the instruments and reactors used in the experiment and the size thereof are summarized in Table 1 below.

TABLE 1

| Reactors and Instruments | Size | Miscellaneous |
|---|---|---|
| Cyclic aeration reactor | 5.0 L ($\phi$ = 17 cm, H = 25 cm) | Round Rod-type, Municipal Wastewater Digestion Sludge |
| Continuous aeration reactor | 1.7 L ($\phi$ = 10 cm, H = 25 cm) | Round Rod-type |
| Sedimentation tank | 2.5 ($\phi$ = 20 cm, H = 25 cm) | Conical-type, Hopper Slope is maintained as 60°. |
| Microorganism control tank | 0.2 ($\phi$ = 0.7 cm, H = 18 cm) | Round Rod-type |
| pH meter | Orione 250A | pH, temperature determination |
| Transferring Pump | Master-flex pump | 2 Heads |
| Mixer | Panasonic M6GA30M | 60 rpm |
| Blower | Koreadakkasi ™ SPP-200GJ-H | A capacity of 40 L/min |

A pH meter was used to measure the pH and ORP (Oxidation Reduction Potentials) in the cyclic aeration reactor and continuous aeration reactor, etc. The blower was provided to feed air into the cyclic aeration reactor and continuous aeration reactor. In the cyclic aeration reactor, the total retention time of the wastewater in the reactor was 6 hours and the blower timer was used to automatically control each retention time such that the time for supplying air is 3.5 hours, the Anoxic state is maintained to be 1.5 hours and the retention time for the Anaerobic state is 1 hour.

The fabricated apparatus was operated to treat the wastewater for 6 months and the treatment efficiencies were summarized as the average values obtained from the laboratory operation in Table 2.

TABLE 2

|  | BOD | | T-N (total nitrogen) | | T-P (total phosphorus) | |
|---|---|---|---|---|---|---|
|  | Conc. (mg/L) | Removal efficiency (%) | Conc. (mg/L) | Removal efficiency (%) | Conc. (mg/L) | Removal efficiency (%) |
| Raw Wastewater | 117 | — | 44 | — | 4.1 | — |
| Effluent | 4.8 | 95.9 | 12 | 72.7 | 1.5 | 63.4 |

As seen in Table 2, the resulting water after completion of the treatment according to the present invention showed very good quality. That is, the removal efficiency of nitrogen and phosphorus was 72.7% and 63.4%, respectively, and BOD was 4.8 mg/L, which means that the removal efficiency of the organic materials is very excellent as 95.9%. Thus, the process of the present invention has both the very excellent organic material removal efficiency and the good nutrient removal efficiency.

Therefore, it can be noted that the wastewater treated by the apparatus of the present invention satisfied the requirement for effluent water from the municipal wastewater treating plants.

Given to the above results, the apparatus for treating municipal wastewater according the present invention are easy for operation thereof and provides good efficiency in removing both the organic materials and the nutrients so that it can be applied for a large scale of the wastewater treatment plant as well as a small scale of the plant.

What is claimed is:

1. A municipal wastewater treatment apparatus comprising:
    a cyclic aeration reactor (2) having the wastewater fed continuously for 24 hours, which is aerated cyclically by a timer that is operated at a predetermined time interval to create an Aerobic state, wherein ammonia nitrogen is nitrified by the microorganisms eluted from a microorganism control tank in the Aerobic state, the nitrified nitrate nitrogen is reduced into $N_2$ gas and removed in an Anoxic state in which oxygen supply is stopped, and phosphorus is eluted in a form of orthophosphate (PO4-P) by phosphorus accumulating organisms (PAOs) which can accumulate phosphorus in a form of polyphosphate (poly-p) within cells of the organisms in an Anaerobic state in which NOx-N concentration in the cyclic aeration reactor reaches zero by denitrification in the Anoxic state;
    a microorganism control tank (5) which is equipped in the cyclic aeration reactor and elutes activated microorganisms in the Aerobic state of the cyclic aeration reactor;
    a continuous aeration reactor (3), which is aerated by oxygen fed continuously for 24 hours, to further treat some organic materials which are not treated in the cyclic aeration reactor due to the continuous influx;
    a sedimentation tank (4) for solid-liquid separation of the microorganisms from the treated water;
    a sludge return line (13) for returning sedimented sludge in the sedimentation tank into the cyclic aeration reactor depending on the amount necessary for the microorganism concentration in the cyclic aeration reactor;
    a waste sludge line (14) for transferring excess sludge in the sedimentation tank to a sludge storage tank (6);
    a sludge storage tank (6) for discarding the excess of sludge; and
    a return line (13) of the sludge storage tank for supplying the supernatant to the cyclic aeration reactor together with the fed wastewater.

2. The apparatus of claim 1, wherein the time for supplying air is 3.5 hours, the Anoxic state is maintained to be 1.5 hours and the retention time for the Anaerobic state is 1 hour.

3. In a method for treating the municipal wastewater, the method comprising:
    a nitrifying step of oxidizing ammonia nitrogen by microorganisms eluted from a microorganism control tank in an Aerobic state of a cyclic aeration reactor;
    a denitrifying step of reducing nitrified nitrate nitrogen into $N_2$ gas in an Anoxic state of the cyclic aeration reactor in which oxygen supply is stopped;
    a step of eluting phosphorus in a form of PO4-P by PAOs, which can accumulate phosphorus in a form of polyphosphate granule (Xpp) within cells of the PAOs in an Anaerobic state in which NOx-N concentration in the cyclic aeration reactor reaches zero by denitrification in the Anoxic state;
    a continuous aeration step of treating secondarily some organic materials, which are not treated in the cyclic aeration reactor due to continuous feeding of wastewater, by using oxygen fed continuously for 24 hours;
    a sedimentation step for solid-liquid separation of the microorganisms from the treated wastewater and forming sedimented sludge;
    a sludge return step for returning into the cyclic aeration reactor the sludge of necessary amount for the microorganism concentration in the cyclic aeration reactor among the sedimented sludge and concentrating the rest of the sedimented sludge as excessive sludge in a sludge storage tank; and
    a step of discarding the sludge concentrated in the sludge storage tank and supplying the sludge storage tank supernatant to the cyclic aeration reactor with the fed wastewater.

* * * * *